United States Patent
Urakawa

(10) Patent No.: US 12,474,876 B2
(45) Date of Patent: *Nov. 18, 2025

(54) SYSTEM INCLUDING FIRST DEVICE COPYING SHORTCUT INFORMATION TO PORTABLE MEMORY, AND SECOND DEVICE PERFORMING SHORTCUT RELATED PROCESS BASED ON THE SHORTCUT INFORMATION STORED IN THE PORTABLE MEMORY

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,290

(22) Filed: Mar. 26, 2024

(65) Prior Publication Data
US 2024/0231711 A1 Jul. 11, 2024

Related U.S. Application Data

(63) Continuation of application No. 18/453,402, filed on Aug. 22, 2023, now Pat. No. 11,989,463.

(30) Foreign Application Priority Data

Aug. 31, 2022 (JP) .................. 2022-137948
Aug. 31, 2022 (JP) .................. 2022-137949

(51) Int. Cl.
*G06F 3/12* (2006.01)
*G06F 3/04817* (2022.01)
*H04N 1/00* (2006.01)

(52) U.S. Cl.
CPC ........ *G06F 3/1204* (2013.01); *G06F 3/04817* (2013.01); *G06F 3/1257* (2013.01); *H04N 1/00503* (2013.01); *H04N 1/00965* (2013.01)

(58) Field of Classification Search
CPC .............. G06F 3/1204; G06F 3/04817; G06F 3/08417; G06F 3/1257; H04N 1/00944;
(Continued)

(56) References Cited

U.S. PATENT DOCUMENTS 8,705,076 B2 * 4/2014 Lee .................. G06F 3/1237
358/1.14
9,094,559 B2 7/2015 Kittaka
(Continued)

FOREIGN PATENT DOCUMENTS

JP 2003-150009 A 5/2003

OTHER PUBLICATIONS

Notice of Allowance dated Jan. 18, 2024 from parent U.S. Appl. No. 18/453,402.

*Primary Examiner* — Scott A Rogers
(74) *Attorney, Agent, or Firm* — Scully, Scott, Murphy & Presser, PC

(57) ABSTRACT

A system includes first and second image forming devices including first and second controllers respectively. The first controller displays a shortcut icon on the basis of shortcut information. The shortcut information specifies that an image formation process and a settings value thereof are associated with a shortcut icon. In response to receiving an operation on the shortcut icon, the controller controls a first image formation engine to perform an image formation process specified in the shortcut information using the settings value specified in the shortcut information. In response to receiving an instruction, the first controller copies the shortcut information to the portable memory so that the portable memory stores copied shortcut information. After the portable memory is mounted on the second image forming device, the second controller performs a shortcut process related to the copied shortcut information.

14 Claims, 10 Drawing Sheets

(58) Field of Classification Search
CPC .......... H04N 1/00938; H04N 1/00946; H04N 1/00965; H04N 1/00501; H04N 1/00503; H04N 1/00506; H04N 1/00509; H04N 1/00517; H04N 1/503; H04N 1/506
USPC ........................................................ 358/1.15
See application file for complete search history.

(56) References Cited

U.S. PATENT DOCUMENTS

| | | | |
|---|---|---|---|
| 10,079,961 B2 | 9/2018 | Ando et al. | |
| 10,110,761 B2* | 10/2018 | Subana | H04N 1/00411 |
| 10,122,874 B2* | 11/2018 | Santillan | H04N 1/00413 |
| 11,106,348 B2* | 8/2021 | Horiike | G06F 3/0485 |
| 11,989,463 B2* | 5/2024 | Urakawa | G06F 3/04817 |
| 2004/0161257 A1* | 8/2004 | Ishihara | G06K 15/00 |
| | | | 399/81 |
| 2010/0296010 A1* | 11/2010 | Finnegan | H04N 5/775 |
| | | | 348/794 |
| 2016/0295033 A1 | 10/2016 | Hirasawa | |
| 2016/0352932 A1 | 12/2016 | Asai | |
| 2016/0360051 A1* | 12/2016 | Santillan | H04N 1/00411 |
| 2017/0277393 A1* | 9/2017 | Iwashita | G06F 3/04847 |
| 2018/0013900 A1 | 1/2018 | Hirasawa | |
| 2018/0260172 A1* | 9/2018 | Nakamura | H04L 41/0806 |
| 2019/0107937 A1* | 4/2019 | Morita | G06F 3/0482 |
| 2019/0238689 A1 | 8/2019 | Hirasawa | |
| 2020/0285437 A1* | 9/2020 | Mori | G06F 3/1203 |
| 2022/0191338 A1* | 6/2022 | Oga | H04N 1/00514 |

* cited by examiner

FIG. 3

| | | |
|---|---|---|
| 21 SHORTCUT DISPLAY NAME | ShortCut13 | ShortCut15 |
| 22 REGISTRATION POSITION NUMBER | 4 | 9 |
| 23 FUNCTION | Scan To EmailServer | Scan To EmailServer |
| 24 INITIAL VALUES | Address:○○@xxx.co.jp<br>ScanSize: A4<br>Brightness: 0<br>File Name:mail<br>Contrast: 0<br>File Name Style:Name_Counter<br>File Size: Medium<br>Skip Blank Page:Off | Address:□□@xxx.co.jp<br>ScanSize: A4<br>Brightness: 0<br>File Name:Sendfile<br>Contrast: 0<br>File Name Style:Name_Counter<br>File Size: Medium<br>Skip Blank Page: ON |
| 25 ONETOUCH SETTING | OFF | ON |

20

SYSTEM INCLUDING FIRST DEVICE COPYING SHORTCUT INFORMATION TO PORTABLE MEMORY, AND SECOND DEVICE PERFORMING SHORTCUT RELATED PROCESS BASED ON THE SHORTCUT INFORMATION STORED IN THE PORTABLE MEMORY

REFERENCE TO RELATED APPLICATIONS

This application is a continuation of U.S. patent application Ser. No. 18/453,402, filed Aug. 22, 2023, which claims priorities from Japanese Patent Application Nos. 2022-137948 filed on Aug. 31, 2022 and 2022-137949 filed on Aug. 31, 2022. The entire contents of the aforementioned applications are incorporated herein by reference.

BACKGROUND ART

A device known in the art can record an image formation process in association with a shortcut icon so that the device executes the associated image formation process in response to the operation of the shortcut icon.

SUMMARY

Here, user convenience could be improved when the content of a shortcut registered on one image forming device could also be registered on other image forming devices used by the user. However, in order to register the content of the shortcut on other image forming devices, the same registration settings must be performed on the other image forming devices, which may greatly increase the user's operational burden. No prior art provides consideration for this issue.

In view of the foregoing, it is an object of the present disclosure to provide a system and an image forming device with enhanced user convenience for registering a function as a shortcut on other devices after the function has already been registered as a shortcut on one device.

In order to attain the above and other object, a system. The system includes a first image forming device, and a second image forming device. The first image forming device includes a first user interface, a first memory, a first image formation, and a first controller. On the first memory interface a portable memory can be detachably mounted. The first image formation engine is configured to form an image. The second image forming device includes a second user interface, a second memory interface, a second image formation engine, and a second controller. On the second memory interface the portable memory can be detachably mounted. The second image formation engine is configured to form an image. The first controller is configured to perform: an image formation process to form an image using the first image formation engine; displaying a shortcut icon on the basis of a piece of shortcut information on the first user interface, the piece of shortcut information specifying an image formation process and a settings value for the image formation process, the piece of shortcut information further specifying that the image formation process and the settings value are associated with a shortcut icon; in response to receiving an operation on the shortcut icon, controlling the first image formation engine to perform the image formation process specified in the piece of shortcut information using the settings value specified in the piece of shortcut information; and in response to receiving an instruction via the first user interface, copying the piece of shortcut information to the portable memory mounted on the first memory interface so that the portable memory stores a copied piece of shortcut information. The second controller is configured to perform: an image formation process to form an image using the second image formation engine; and after the portable memory is mounted on the second memory interface, a shortcut process related to the copied piece of shortcut information.

According to another aspect, the disclosure provides an image forming device. The image forming device includes a user interface, a memory interface, an image formation engine, and a controller. On the memory interface a portable memory can be detachably mounted. The image formation engine is configured to form an image. The controller is configured to perform: an image formation process to form an image using the image formation engine; displaying a shortcut icon on the basis of a piece of shortcut information on the user interface, the piece of shortcut information specifying an image formation process and a settings value for the image formation process, the piece of shortcut information further specifying that the image formation process and the settings value are associated with a shortcut icon; in response to receiving an operation on the shortcut icon, controlling the image formation engine to perform the image formation process specified in the piece of shortcut information using the settings value specified in the piece of shortcut information; and after the portable memory storing a copied piece of shortcut information is mounted on the memory interface, a shortcut process related to the copied piece of shortcut information, the copied piece of shortcut information being a copy of the piece of shortcut information.

According to still another aspect, the disclosure provides an image forming device. The image forming device includes a user interface, a memory interface, and a controller. On the memory interface a portable memory can be detachably mounted. The image formation engine is configured to form an image. The controller is configured to perform: an image formation process to form an image using the image formation engine; displaying a shortcut icon on the basis of a piece of shortcut information on the user interface, the piece of shortcut information specifying an image formation process and a settings value for the image formation process, the piece of shortcut information further specifying that the image formation process and the settings value are associated with a shortcut icon; in response to receiving an operation on the shortcut icon, controlling the image formation engine to perform the image formation process specified in the piece of shortcut information using the settings value specified in the piece of shortcut information; and in response to receiving an instruction via the user interface, copying the piece of shortcut information to the portable memory mounted on the memory interface so that the portable memory stores a copied piece of shortcut information.

In the above structure, a system and an image forming device can provide a user with enhanced convenience for registering a function as a shortcut on other devices after the function has already been registered as a shortcut on one device.

BRIEF DESCRIPTION OF DRAWINGS

FIG. 3 is a table illustrating a configuration of the shortcut information.

DESCRIPTION

First Embodiment

Figure 1:
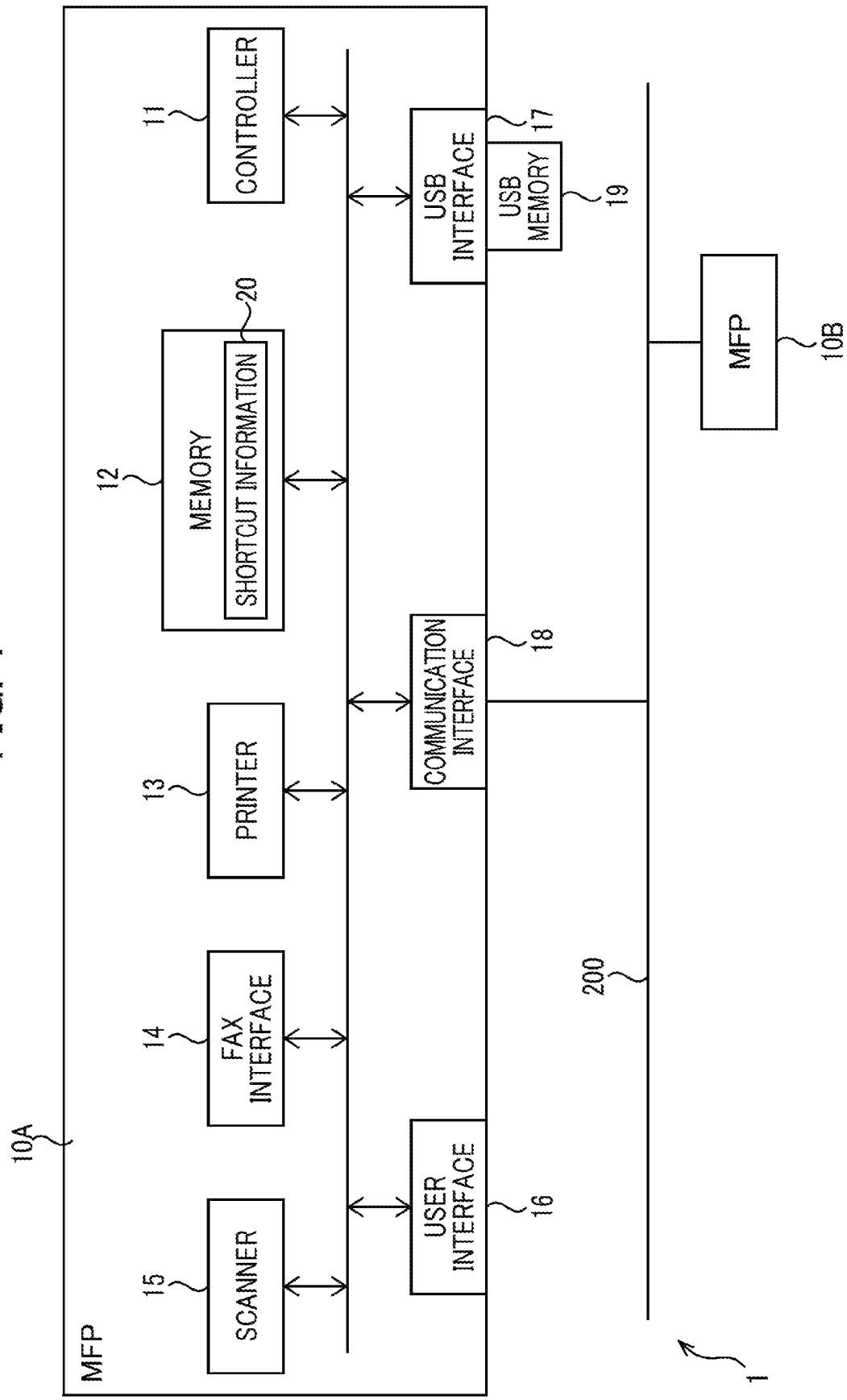
FIG. 1 is a block diagram illustrating a system.

A multifunction peripheral (abbreviated as MFP) will be described as an embodiment of the image forming device. As shown in FIG. 1, a system 1 includes an MFP 10A and an MFP 10B that are connected to a network 200. The MFP 10A is provided with a controller 11, a memory 12, a printer 13, a fax interface 14, a scanner 15, a user interface 16, a USB interface 17, and a communication interface (network interface) 18. These components are all interconnected and capable of communicating with each other via a bus. The structure of the MFP 10B is identical to that of the MFP 10A and, thus, a description of the structure of the MFP 10B will be omitted. The MFP 10A is an example of the first device and the MFP 10B is an example of the second device.

The communication interface 18 connects the MFP 10A to the network 200. Consequently, the MFP 10A can communicate via the network 200 with a PC (not shown) connected to the network 200 according to a prescribed protocol. The scanner 15 has an image sensor, such as a CCD or a CIS, for reading an original to generate image data. The generation of the image data is an example of the image formation. The printer 13 executes a printing operation to print images on a recording medium, such as sheets or discs. Sheets may also be referred to as paper. The printing is an example of the image formation. The printer 13 may employ any of various recording methods, such as the inkjet method or the electrophotographic method.

The user interface 16 is an interface capable of receiving various user operations on the MFP 10A. The user interface 16 includes a touchscreen having a liquid crystal display, various switches, and the like. The USB interface 17 reads data from and writes data to a USB memory 19, which is a portable memory detachably connected to the USB interface 17, according to the USB standard. Instead of the USB memory 19, an SD card memory as the portable memory may be connected to the USB interface 17 via an adapter. The communication interface 18 performs wireless LAN communications or the like to communicate with PCs and servers (not shown) connected to a wireless LAN. The printer 13, the fax interface 14, and the scanner 15 perform copy, scan, fax transmission, and fax reception processes in response to instructions from the controller 11. The copy, scan, fax transmission, and fax reception processes are examples of the image formation.

The memory 12 includes volatile memory such as RAM, rewritable nonvolatile memory such as NVRAM, and ROM. An SSD (Solid State Drive) and an HDD (Hard Disk Drive) may be used as the rewritable nonvolatile memory. A buffer, which is provided on the controller 11 and used when executing various types of programs, may be a part of the memory 12. The memory 12 may be any storage medium that can be read by the controller 11. The storage medium that can be read by the controller 11 is non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The controller 11 includes a CPU and an internal memory. In the embodiment, the controller 11 performs the processes described below according to instructions in programs. In the following description, actions such as "determine," "extract," "select," "calculate," "decide," "identify," "acquire," "receive," "control," "set," and the like represent processes performed by the controller 11. Note that the term "acquire" in this specification is used as a concept that does not necessarily require a request. In other words, a process by which the controller 11 receives data without requesting that data is included in the concept of "the controller 11 acquires data." The term "data" described herein is expressed as bit strings that can be read by the controller 11. Data of different formats are treated as the same data when the content of the data is essentially the same. The same holds true for "information" in this specification. The controller 11 may be configured of a single controller or a plurality of controllers. In a case that the controller 11 includes the plurality of controllers, each process (described later) performed by the controller 11 may be distributed to and performed by the plurality of controllers.

Figure 2A:
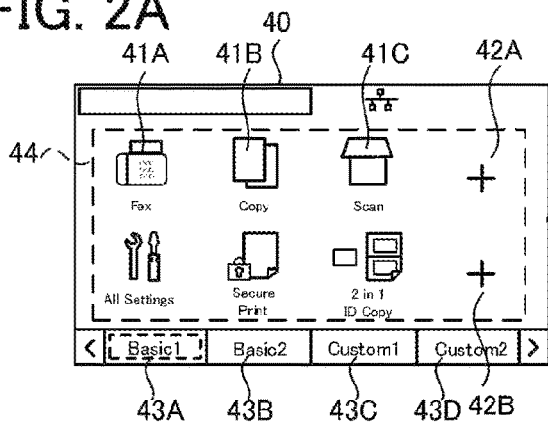
FIGS. 2A-2G are explanatory diagrams illustrating transition of a screen when a shortcut icon is registered.

When the power to the MFP 10A is turned on, the controller 11 displays a home screen 40 shown in FIG. 2A on the user interface 16. The home screen 40 includes an icon display area 44, in which icons are displayed in m rows and n columns (where m and n are natural numbers). The icon display area 44 is indicated by a dashed borderline in FIG. 2A. Specifically, the icon display area 44 of the home screen 40 includes icons 41A, 41B, and 41C (hereinafter also collectively referred to as icons 41) that receive instructions to execute the respective functions fax, copy, and scan, which correspond to image formation processes that the MFP 10 can execute in its initial state. That is, the home screen including the icon display area 44 which is an m×n matrix area including icon areas arranged in an m×n matrix to define m rows and n columns. An icon is capable of being arranged in each icon area. The home screen 40 is configured of a plurality of pages. In the present embodiment, tabs 43A-43D (hereinafter also collectively referred to as "tabs 43") are displayed along the bottom of the screen. By operating one of the tabs 43A-43C, the user can display the page corresponding to the operated tab 43 on the user interface 16. The home screen 40 shown in FIG. 2A displays a "Basic 1" page corresponding to the tab 43A. When the tab 43B is operated, the controller 11 displays a "Basic 2" page shown in FIG. 10A and the like (described later) on the user interface 16.

The icon display area 44 of the home screen 40 may be configured to display an array of icons associated with respective functions. The array may be configured so that the number of rows is 1 or the number of columns is 1, as in 1 row and 3 columns or 3 rows and 1 column, or so that there are two or more of both rows and columns, as in 2 rows and 4 columns or 4 rows and 2 columns. Further, the home screen 40 may have the same natural number of rows and columns, such as 3 rows and 3 columns or 4 rows and 4 columns.

In response to an operation on the icon 41A corresponding to the fax function by the user, the controller 11 executes a fax transmission function using the fax interface 14. The fax transmission function is a function to send scan data generated by the scanner 15 when reading an original, transmission data received from a PC or the like via the communication interface 18, or recorded data read from USB memory or the like via the USB interface 17 to a destination device via the fax interface 14. Additionally, the controller 11 can perform a fax reception process using the fax interface 14 when the user operates the icon 41A. In the fax reception process, fax reception data received via the fax interface 14 can be printed on sheets by the printer 13, transferred to other external devices via the communication interface 18, or written to USB memory via the USB interface 17.

In response to an operation on the icon 41B corresponding to the copy function by the user, the controller 11 implements the copy function using the printer 13 and the scanner 15. The copy function is a function to control the printer 13 to print an image based on scan data generated by the scanner 15 when the scanner 15 reads an original. In response to an operation on the icon 41C corresponding to the scan function by the user, the controller 11 executes the scan function using the scanner 15. The scan function is a function to transmit, to a PC or server for example, scan data generated by the scanner 15 from an original via the communication or a function to write the scan data to the USB memory 19 via the USB interface 17. The copy function executed by using the printer 13 and the scanner 14, the scan function executed by using the scanner 15, and the fax transmission function and reception function by using the fax interface 14 are examples of the image formation process.

Prior to executing the function corresponding to the operated icon 41 in the home screen 40, the controller 11 can display a confirmation screen 70 (see FIG. 4B) corresponding to the function to be executed, as will be described later. By displaying the confirmation screen 70, the controller 11 can prompt the user to confirm the current settings and can receive user operations to modify these settings. In this case, the controller 11 executes the function after detecting an operation on a Start button 72 displayed in the confirmation screen 70.

The icon display area 44 of the home screen 40 also includes unregistered keys 42A and 42B (hereinafter also collectively referred to as unregistered keys 42) to which shortcut images can be assigned. Shortcut images are images associated with functions of the MFP 10A and with various settings used by these functions. In response to instructions received via the user interface 16, the controller 11 can execute a registration process for storing shortcut information 20 in the memory 12. The shortcut information 20 registers a function of the MFP 10A and settings used in this function in association with a shortcut image. Hereafter, a shortcut image associated with the function via a record registered in the shortcut information 20 or a record copied from the shortcut information 20 is referred to as a "record-based shortcut image" or simply "shortcut image". The shortcut image is an example of the shortcut icon. When the user subsequently operates the shortcut image, the controller 11 can execute the function of the MFP 10A associated with the operated shortcut image using the various associated settings without requiring the user to perform a series of function selection operations or operations to configure the various settings. In the following description, the process of associating a function of the MFP 10A and settings used in that function with a shortcut image will be called a "shortcut registration."

Next, a process for registering a new shortcut will be described. In this example, a shortcut image is added to the unregistered key 42A in the home screen 40 displayed on the MFP 10A. When the user operates the unregistered key 42A in the home screen 40, the controller 11 temporarily stores a record in the volatile memory of the memory 12 for the shortcut information 20. In the shortcut information 20, each record includes information for settings items including a shortcut display name 21, a registration position number 22, a function 23, initial values 24, and a OneTouch setting 25. As shown in FIG. 3, information for these setting items are information corresponding to the function targeted by the shortcut registration. The various information in this record is associated with a record in the shortcut information 20 shown in FIG. 3. The shortcut information 20 and the records will be described later. The controller 11 also writes the value of the registration position number corresponding to the operated unregistered key 42 as the registration position number 22 for the record. The registration position number corresponding to the unregistered key 42A is "4".

Figure 2B:
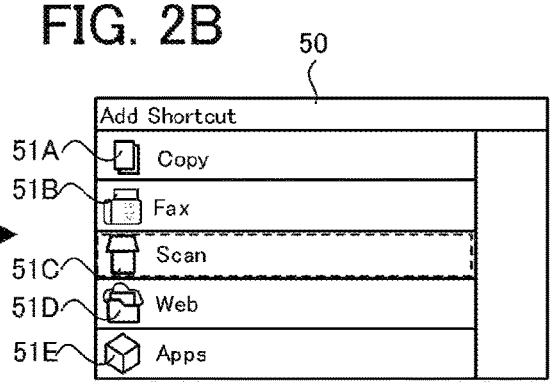

Next, the controller 11 displays a main category selection screen 50 shown in FIG. 2B on the user interface 16. The main category selection screen 50 accepts selection operations for main categories in order to broadly identify the target function of the shortcut registration. The main category selection screen 50 shown in FIG. 2B has a plurality of buttons 51 corresponding to main categories including a button 51A for the copy function, a button 51B for the fax function, a button 51C for the scan function, a button 51D for establishing a network connection, and a button 51E for starting up an application.

Figure 2C:
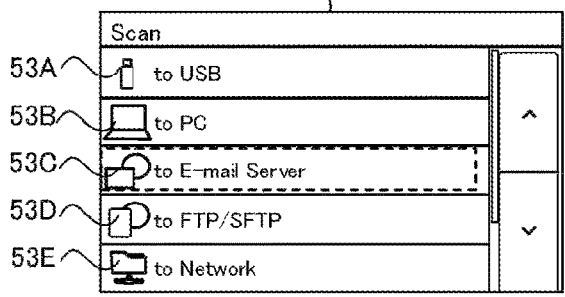

In response to detection of an operation on one of the buttons 51 in the main category selection screen 50, the controller 11 displays a subcategory selection screen 52 on the user interface 16. The subcategory selection screen 52 accepts specifications of subcategories to identify in greater detail the function identified by the operation in the main category selection screen 50. In this example, the user operates the button 51C specifying the scan function as the main category, causing the controller 11 to display the subcategory selection screen 52 shown in FIG. 2C on the user interface 16. The subcategory selection screen 52 accepts a user specification for the saving destination of scan data as the subcategory. The subcategory selection screen 52 includes a plurality of buttons 53A-53E, each of which specifies a different destination for scan data. Specifically, the subcategory selection screen 52 includes a button 53A specifying a USB memory, a button 53B specifying a PC, a button 53C specifying an e-mail server, a button 53D specifying an FTP or SFTP server, and a button 53E specifying a device connected to the network. In a case that there are additional buttons other than the buttons 53A-53E specifying other subcategories, the user can display these buttons in the subcategory selection screen 52 by operating the scrollbar.

When the user operates any of the buttons 53A-53E in the subcategory selection screen 52, the controller 11 writes the function identified by the categories selected in the screens 50 and 52 as the function for the temporarily stored record. Hence, the function 23 (FIG. 3) is information specifying the target function of the shortcut registration. In this example, "Scan" is selected in the main category selection screen 50 and "Save to e-mail server" is selected in the subcategory selection screen 52. Therefore, the controller 11 writes "Scan to e-mail server" to the function 23 of the temporarily stored record and writes the preset values of settings corresponding to "Scan to e-mail server" to the initial values 24. The controller 11 also writes "OFF" as the value of the OneTouch setting 25 in the temporarily stored record.

Here, "temporary storing" denotes the action of storing information in a volatile area of the memory 12 for working purposes prior to "registering" that information. Temporary storing includes the temporary storing of records and the temporary storing of information other than records. "Registering" denotes the action of copying temporarily stored information to a nonvolatile area of the memory 12.

Figure 2D:
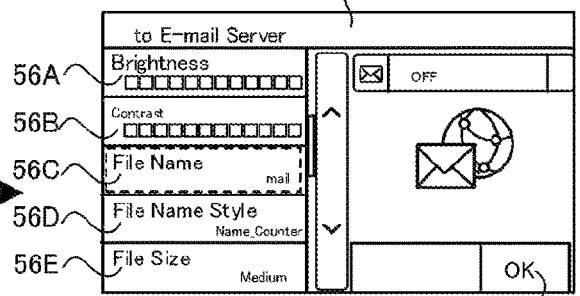
Figure 2E:
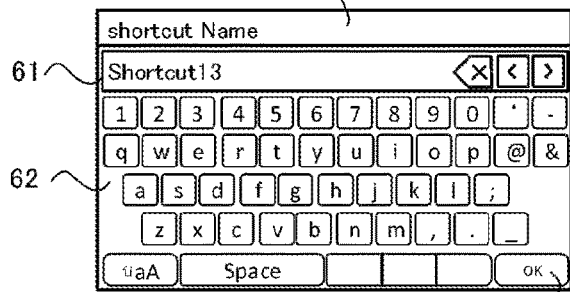

When the user has finished configuring the target function for the shortcut registration, the controller 11 displays an initial settings screen 55 shown in FIG. 2D on the user interface 16. The initial settings screen 55 includes buttons 56A-56E (hereinafter also collectively referred to as buttons 56) corresponding to the various settings for the function specified by the function 23 in the temporarily stored record. In the buttons 56A-56E the corresponding settings are displayed. The buttons 56A-56E in the screen shown in FIG. 2D correspond to settings for "Scan to e-mail server."

Settings used when executing a shortcut vary according to the function for which the shortcut is being registered. When the function is related to copying, for example, settings are provided for the items "output size," "quality," "color setting," "number of copies," "two-sided printing," and the like. Alternatively, when the function is related to scanning, settings values are used for the items "save destination," "reading size," "output size," "quality," "color," "scale," and etc. Since the function "Scan to e-mail server" in this case is a type of the scanning function, settings values are used for the items "address" (a type of destination), "scan size" (a type of reading size), "file size" (a type of output size), and "brightness" and "contrast" (types of quality). The "Scan to e-mail server" function also uses settings for the items "filename" specifying the name for the saved file, "filename style" specifying the style of the filename, and "skip blank page" specifying whether blank pages are to be excluded from the scan data being saved. An example of predetermined settings for the "Scan to e-mail server" function are "blank" for address, "A4" for scan size, "0" for brightness, "mail" for filename, "0" for contrast, "Name_Counter" for Filename style, "Medium" for file size, and "OFF" for skip blank page.

When the controller 11 detects that one of the buttons 56 corresponding to a settings item that does not require text input (e.g., buttons 56A, 56B, 56D, and 56E) is operated in the initial settings screen 55, the controller 11 displays a detailed settings screen on the user interface 16 showing the settings of the preset values stored as the initial values 24 for the target item corresponding the operated button 56. The detailed settings screen accepts operations to modify the settings or value of the target item from that in the initial values 24. For example, when either of the buttons 56A or 56B corresponding to "brightness" and "contrast," respectively, is operated, the controller 11 displays a detailed settings screen for receiving an inputted value between 0 and 10 while showing the preset value "0" stored as the initial value 24. When the button 56D corresponding to "filename style" is operated, the controller 11 displays a detailed settings screen for accepting a selection among options such as "Name_Counter" and "Name_time" while showing the initial value "Name_Counter." The item "filename style" specifies the style of the file name of the scan data being saved, and specifies a character string to be added to the string constituting the value of the item "filename". Here, "Name_Counter" specifies that a consecutive number is to be added to the inputted value of the item "filename", and "Name_Time" specifies that the day, hour, minute, and second, and the like is to be added to the inputted value of the item "filename." When a button 56 corresponding to "skip blank page" (not shown in FIG. 2) is operated, the controller 11 displays a detailed settings screen for accepting a selection between "ON" and "OFF" while showing the preset value "OFF" stored as the initial value 24. When a button 56 corresponding to "two-sided scan," "color setting," "resolution," or "file type," is operated, the controller 11 displays a detailed settings screen for accepting a selected value for the corresponding settings item while showing the corresponding initial value stored as the initial value 24.

A selected value may be inputted into the detailed settings screens by entering the numerical value, as described above, or by selecting one of multiple options as described above. The controller 11 temporarily stores values inputted into the detailed settings screen in the volatile memory in the memory 12. Here, these inputted values is stored in a storage area of the volatile memory different from that of the temporarily stored record Once the controller 11 has received an operation to quit input, the controller 11 overwrites the initial values 24 corresponding to the setting items in the temporarily stored record with the values temporarily stored in the memory 12. Subsequently, the display on the user interface 16 is returned to the initial settings screen 55 shown in FIG. 2D.

When the controller 11 determines that a button 56 corresponding to a settings item requiring the input of text (e.g., the button 56C corresponding to the item "filename") is operated, the controller 11 displays a detailed settings screen on the user interface 16 for accepting operations to modify the settings value. Once the user has entered text in the detailed settings screen as the settings value, the controller 11 overwrites the settings value in the temporarily record stored in the memory 12 with the inputted text. Subsequently, the display on the user interface 16 is returned to the initial settings screen 55 shown in FIG. 2D.

As shown in FIG. 2D, the initial settings screen 55 also includes an OK button 57. When the controller 11 detects an operation on the OK button 57 in the initial settings screen 55, the controller 11 displays a name setting screen 60 shown in FIG. 2E on the user interface 16. The name setting screen 60 accepts operations to modify the value of the shortcut display name 21 in the temporarily stored record. The preset value for the shortcut display name 21 in the temporarily stored record is displayed in a display field 61 of the name setting screen 60 in a manner that the preset value can be modified. The preset value for the shortcut display name 21 in the present embodiment is a string combining "Shortcut" with a number. As an alternative, the preset value for the shortcut display name 21 may be a blank space. The user can operate input keys 62 to input or modify the name displayed in the display field 61. When the user subsequently operates the OK button 57, the controller 11 overwrites the settings value indicated by the shortcut display name 21 in the temporarily stored record with the name entered in the display field 61. Subsequently, the controller 11 displays a mode settings screen 63 shown in FIG. 2F.

Figure 2F:
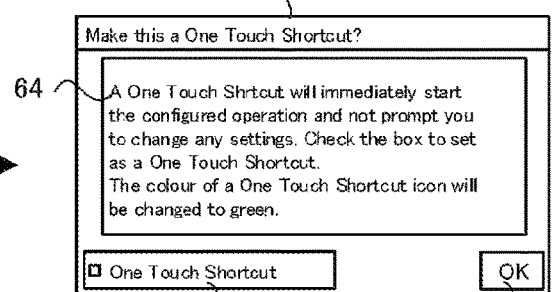
Figure 2G:
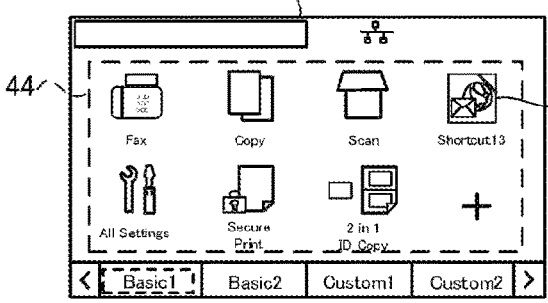

The mode settings screen 63 shown in FIG. 2F accepts an operation to enable (ON) or disable (OFF) a OneTouch shortcut specified by the OneTouch setting 25 in the temporarily stored record. An explanation display field 64 in the mode settings screen 63 displays text explaining that a mode selection button 65 must be operated to enable a OneTouch shortcut. The mode selection button 65 is displayed in a manner for indicating the preset value of the OneTouch setting 25 in the temporarily stored record. In the present embodiment, the preset value of the OneTouch setting 25 is disabled (OFF).

Each time the controller 11 detects that the user has operated the mode selection button 65 once, the controller 11 toggles the checkbox in the mode selection button 65 between checked and unchecked. When the user operates the OK button 57, the controller 11 temporarily stores "ON" as the value of the OneTouch setting 25 when the mode selection button 65 is checked and "OFF" when the mode selection button 65 is unchecked.

The controller 11 registers, in the shortcut information 20 stored in the memory 12, the values of the temporarily stored record. Next, the controller 11 displays the shortcut image associated with the "Scan to e-mail server" function in the icon display area 44 of the home screen 40. Specifically, the unregistered key 42A is removed from the icon display area 44 in the home screen 40 shown in FIG. 2A and replaced with a shortcut image 90 for calling the "Scan to e-mail server" function, which was just registered as a shortcut, as illustrated in the home screen 40 shown in FIG. 2G. The shortcut image 90 added to the home screen 40 displays the text "Shortcut 13" specified by information for the shortcut display name 21 in the record stored in the shortcut information 20. To distinguish home screens such as the home screens shown in FIGS. 2A and 2G, the ordinal numbers may be followed by "home screens". For example, the home screen 44 shown in FIG. 2A may be referred to as the first home screen 44, and the home screen 44 shown in FIG. 2G may be referred to as the second home screen 44. However, even when the ordinal number is added, each home screen has the same basic configuration. Here, one example of the basic configuration of the home screen is the m×n matrix area.

FIG. 3 shows the shortcut information 20 after the record associated with the "Scan to e-mail server" function has been registered. In the shortcut information 20 shown in FIG. 3, information for the shortcut display name 21, registration position number 22, function 23, initial values 24, and OneTouch setting 25 are the same as those in the record that was temporarily stored at the time of the shortcut registration described above. In the example of FIG. 3, the shortcut information 20 also includes a record registered with "Shortcut 15" as the shortcut display name 21.

While records stored in the shortcut information 20 in FIG. 3 includes the records with "Shortcut 13" and "Shortcut 15" as the shortcut display name 21, other records may be registered in the shortcut information 20. Such records may have been registered at the manufacturing stage of the MFP 10A and may have been registered by the vendor of the MFP 10A, the administrator of the MFP 10A, or the administrator of the system 1 in which the MFP 10A is included. Information preset when the MFP 10A was designed is written to a rewritable nonvolatile or non-rewritable area of the memory 12 when the MFP 10A was manufactured in the present embodiment. The preset information may include a password or the like described later in addition to the settings values. The preset information may be information that can be overwritten by the vendor of the MFP 10A, the administrator of the MFP 10A, or the administrator of the system 1 in which the MFP 10A is included.

Figure 4A:
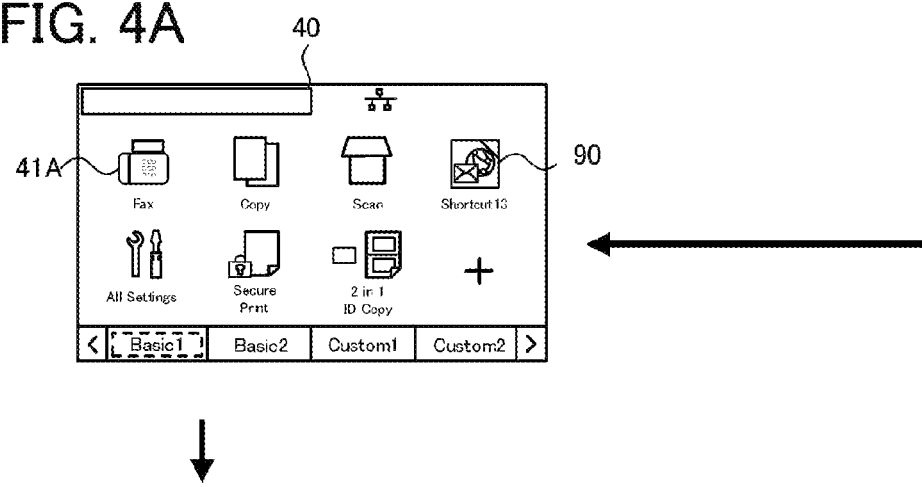
FIGS. 4A-4D are explanatory diagrams illustrating transition of a screen when a function associated with the shortcut icon is executed.

Next, a first shortcut execution process will be described. The first shortcut execution process implements the "Scan to e-mail server" function, registered as a shortcut, when the shortcut image 90 (FIG. 4A) displayed in the user interface 16 of the MFP 10A is operated. When the controller 11 detects an operation on the shortcut image 90 in the home screen 40 shown in FIG. 4A, the controller 11 reads the record having "Shortcut 13" as the shortcut display name 21 from the shortcut information 20, and temporarily stores the read record in the volatile area.

Figure 4B:
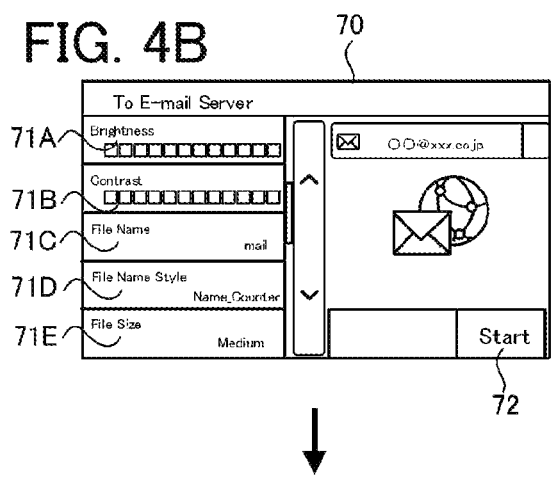
Figure 4C:
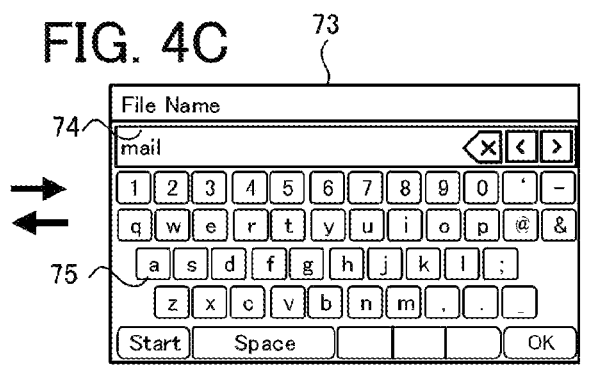

Next, the controller 11 displays the confirmation screen 70 shown in FIG. 4B on the user interface 16 on the basis of the record read from the shortcut information 20. The confirmation screen 70 shown in FIG. 4B has the same configuration as the initial settings screen 55 in FIG. 2D. Buttons 71A-71E in the confirmation screen 70 are identical to the buttons 56A-56E in the initial settings screen 55. The setting values initially shown in the confirmation screen 70 are based on the values of the initial values 24 in the read record. Accordingly, the user can verify the settings values that will be used when the shortcut is executed. Further, by operating one of the buttons 71A-71E, the user can display a detailed settings screen for the corresponding item, just as when operating the buttons 56A-56E. When the controller 11 receives input in the detailed settings screen for modifying a setting, the controller 11 overwrites the corresponding setting in the temporarily stored record to the modified setting based on the input. For example, when the controller 11 detects an operation on the button 71C in the confirmation screen 70, the controller 11 displays a detailed settings screen 73 corresponding to the settings item "filename," as illustrated in FIG. 4C. At this time, "mail" specified in the initial values 24 of the record read above for the settings item "filename" is displayed in a display field 74 of the detailed settings screen 73. When the controller 11 receives input through operations on operating keys 75 in the detailed settings screen 73, such as the text "mail602," the controller 11 can modify the initial value "mail" for the temporarily stored item to "mail602." The setting values shown in the confirmation screen 70 are also modified to the values that the user has inputted.

Figure 4D:
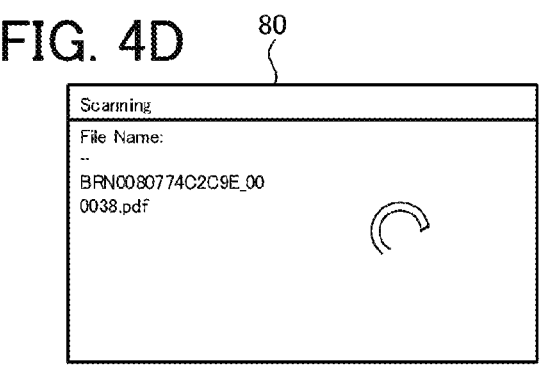

Once the controller 11 detects an operation on the Start button 72 in the confirmation screen 70, the controller 11 executes the "Scan to e-mail server" function using the values in the temporarily stored record. As descried above, when the shortcut image 90 is operated, the controller 11 displays the confirmation screen 70. When an operation is received through the confirmation screen 70, the controller 11 displays the detailed settings screen corresponding to this operation. When operations are received to modify settings values in the detailed settings screens, the controller 11 then executes the function of the shortcut image 90 using the modified settings values. When the controller 11 receives no operations to modify a settings value even when displaying a detailed settings screen after the shortcut image 90 is operated, the controller 11 does not modify the corresponding settings value in the temporarily stored record. For the settings item corresponding to the detailed settings screen that are not displayed, values that are not modified from those in the initial values 24 is used to execute the function. When executing the function, the controller 11 displays an execution screen 80 shown in FIG. 4D on the user interface 16 to inform the user that the function registered for the shortcut is being executed. After the function has been executed, the controller 11 returns the display to the home screen 40 shown in FIG. 4A.

As described above, the record is read from the shortcut information 20 and temporarily stored. Setting values in the temporarily stored record are modified according to the user inputs through the detailed settings screens and the function is executed on the basis of the record including the modified settings values. However, the record may not be temporarily stored. In this case, settings values are inputted for the setting items through the corresponding detailed settings screens, these inputted settings values are temporarily stored and used for executing the function. In this case, for the settings items whose detailed settings screens are not displayed, settings in the initial values 24 is used for executing the function.

Next, the process for copying the "Scan to e-mail server" function registered as a shortcut to the USB memory 19 will be described with reference to the flowchart shown in FIG. 5. This process is executed in response to an operation on the shortcut image 90 in the home screen 40 of the MFP 10A. The controller 11 executes the process shown in FIG. 5 when the user presses and holds the shortcut image 90 in the home screen 40 shown in FIG. 6A. The home screen 40 shown in FIG. 6A is identical to the home screen 40 shown in FIG. 4A. The operation to press and hold the shortcut image 90 is an example of the special operation.

Figure 5:
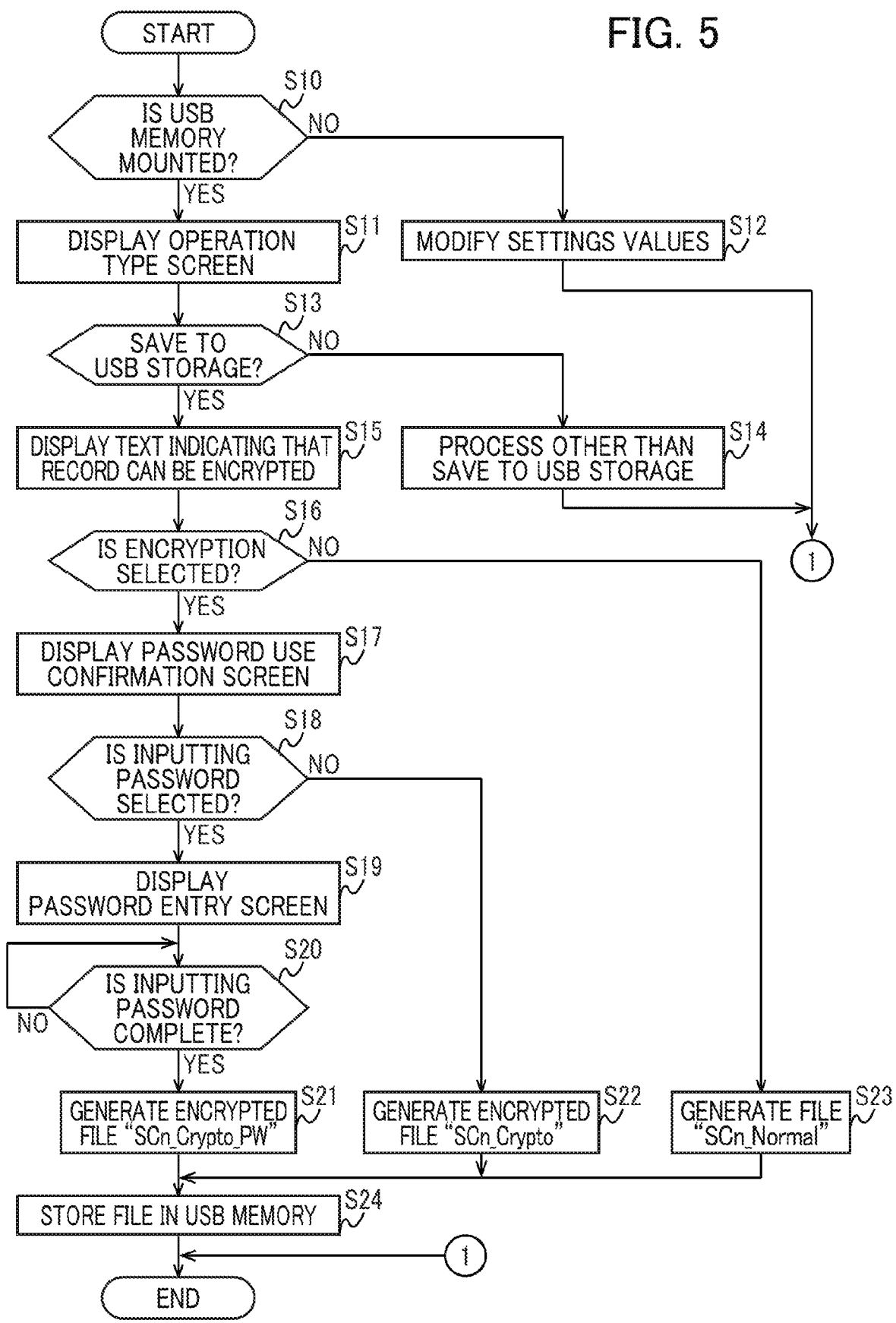
FIG. 5 is a flowchart illustrating a process to copy a record in the shortcut information to a portable memory.
Figure 6A:
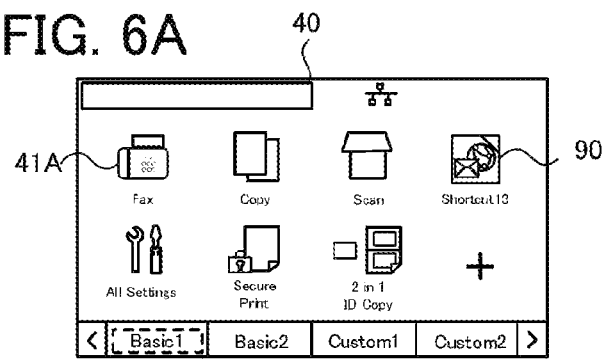
FIGS. 6A-6E are explanatory diagrams illustrating transition of a screen when a record in the shortcut information is copied to the portable memory.
Figure 6B:
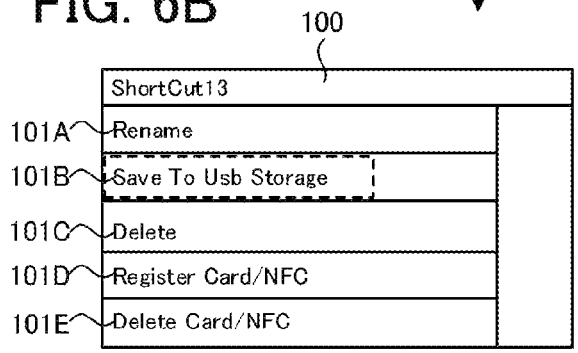

In S10 of FIG. 5, the controller 11 determines whether the USB memory 19 is mounted in the USB interface 17. When the USB memory 19 is mounted in the USB interface 17 (S10: YES), in S11 the controller 11 displays an operation type screen 100 shown in FIG. 6B on the user interface 16. The operation type screen 100 includes buttons 101A-101E (hereinafter also collectively referred to as buttons 101) corresponding to various processes registered in the shortcut information 20. Of these, the button 101A is operated to receive instructions to modify the shortcut display name 21 within the record corresponding to the target function "Scan to e-mail server." The button 101B is operated to copy the record corresponding to the "Scan to e-mail server" function to the USB memory 19. The button 101C is operated to issue an instruction to delete the record corresponding to the "Scan to e-mail server" function. The operation type screen 100 may include other buttons for inputting operations to modify values of settings items in the record other than the shortcut display name 21.

In S13 the controller 11 determines whether the button 101B was operated. When the controller 11 detects that a button other than the button 101B, i.e., one of the buttons 101A, 101C, 101D, and 101E (S13: NO), in S14 the controller 11 executes a process corresponding to the operated button 101. After completing the process in S14, the controller 11 ends the process of FIG. 5 and returns the screen displayed on the user interface 16 to the home screen 40 shown in FIG. 6A.

Note that when the USB memory 19 is not mounted in the USB interface 17 (S10: NO), in S12 the controller 11 executes a process for modifying settings values in the shortcut information 20 that are associated with the shortcut image 90. Specifically, the controller 11 displays a screen (not shown) similar to that of FIG. 6B while omitting the button 101B, and executes the process corresponding to the user-operated button 101. After completing the process in S12, the controller 11 ends the process of FIG. 5 and returns the screen displayed on the user interface 16 to the home screen 40 shown in FIG. 6A.

Figure 6C:
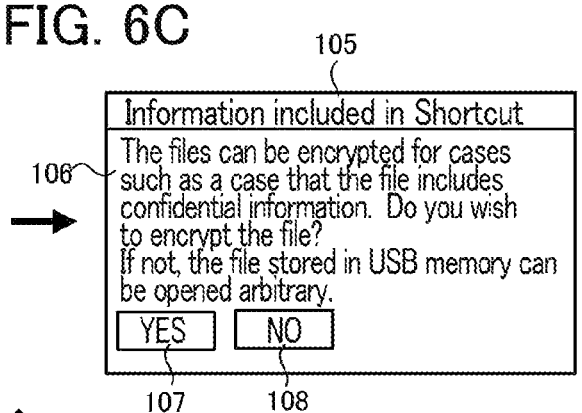

When the controller 11 detects that the button 101B was operated in the operation type screen 100 (S13: YES), in S15 the controller 11 displays an encryption selection screen 105 shown in FIG. 6C on the user interface 16. The encryption selection screen 105 includes a text display area 106, a Yes button 107, and a No button 108. The text display area 106 includes text indicating that the record corresponding to the target function can be encrypted when copied to the USB memory 19.

In S16 the controller 11 determines whether the Yes button 107 was operated in the encryption selection screen 105. When the controller 11 detects that the No button 108 was operated (S16: NO), in S23 the controller 11 generates a file having the filename "SCn_Normal" that duplicates the record for the "Scan to e-mail server" function. The filename "SCn_Normal" is formed by combining "SCn," which identifies the individual function registered as a shortcut, with "Normal," which indicates that the record is not encrypted. In the present embodiment, "n" is a value that uniquely identifies the function for which a shortcut was registered.

Figure 6D:
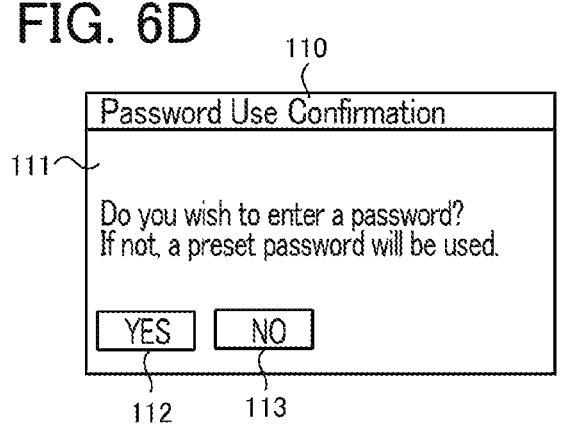

When the controller 11 detects that the Yes button 107 was operated in the encryption selection screen 105 (S16: YES), in S17 the controller 11 displays a password use confirmation screen 110 shown in FIG. 6D on the user interface 16. The password use confirmation screen 110 includes a text display area 111, a Yes button 112, and a No button 113. The text display area 111 displays text indicating that the record being copied to the USB memory 19 can be encrypted using an arbitrary password inputted by the user and will be encrypted using a preset password when the user does not input a password. Here, the MFP 10A and the MFP 10B in the system 1 both may store the same preset password in the respective nonvolatile areas of the memories 12 in advance.

In S18 the controller 11 determines whether the Yes button 112 was operated in the password use confirmation screen 110. When the controller 11 detects that the No button 113 was operated (S18: NO), in S22 the controller 11 generates a file having the filename "SCn_Crypto" that duplicates the record of the "Scan to e-mail server" function after encrypting the record using a preset password. The filename "SCn_Crypto" is formed by combining "SCn," which identifies the individual function for which the shortcut was registered, with "Crypto," indicating that the copied record has been encrypted using a preset password.

Figure 6E:
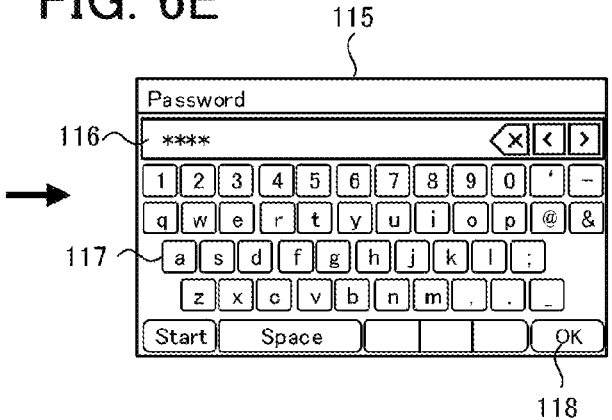

On the other hand, when the controller 11 detects that the Yes button 112 was operated in the password use confirmation screen 110 (S18: YES), in S19 the controller 11 displays a password entry screen 115 shown in FIG. 6E. The password entry screen 115 includes operating keys 117 that accept user operations to input a desired password, and a display field 116 for displaying the password inputted through operations on the operating keys 117. When inputting a password through operations on the operating keys 117, the display field 116 displays "**," as in the password entry screen 115 shown in FIG. 6E, to prevent others in the vicinity from seeing the password. The number of characters in "**" is equivalent to the number of characters in the password. While the user has not completed inputting the password (S20: NO), the controller 11 continues to wait at S20. When the user operates an OK button 118 to indicate that password input is complete (S20: YES), the controller 11 advances to S21.

In S21 the controller 11 generates a file having the filename "SCn_Crypto_PW" as a copy of the record for the "Scan to e-mail server" function encrypted using the password inputted into the password entry screen 115. The filename "SCn_Crypto_PW" is formed by combining "SCn," which identifies the individual function for which the shortcut was registered and "Crypto_PW," which indicates that the duplicate record was encrypted using an arbitrarily inputted password.

Note that the controller 11 can copy a file to the USB memory 19 not only for one record corresponding to a single function, but also for a plurality of records corresponding to a plurality of functions. In this case, the controller 11 need only execute the process in FIG. 5 for each function to copy each record to the USB memory 19. When the plurality of records is encrypted in S22, all the records will be encrypted using a preset common password. When a plurality of records is encrypted in S21, the password inputted by the user will be commonly used to encrypt all of the records.

After executing the process in one of S21, S22, and S23, the controller 11 advances to S24. In S24 the controller 11 stores the file created in S21, S22, or S23 in the USB memory 19. This completes the process shown in FIG. 6. The process through S21, S22, S23, and S24 is an example of the copying process. Here, encrypting records in S21 by the controller 11 is an example of the encrypting in the first method and encrypting records in S22 by the controller 11 is an example of the encrypting in the second method.

After copying a record to the USB memory 19 in S24, the controller 11 may delete the record from the memory 12 of the MFP 10A so that the record is no longer registered in the shortcut information 20. Further, after the USB memory 19 is mounted in the MFP 10B, as will be described later, the controller 11 of the MFP 10B may temporarily store the copied records from the USB memory 19 in the volatile memory of the memory 12 in the MFP 10B and may subsequently delete the file holding the records from the USB memory 19.

Next, a process executed by the controller 11 of the MFP 10B will be described. This process is executed when the USB memory 19 is mounted in the USB interface 17 of the MFP 10B after a record for the "Scan to e-mail server" function was copied to the USB memory 19. Prior to executing the process shown in FIG. 7, the controller 11 of the MFP 10B displays the home screen 40 shown in FIG. 8A on the user interface 16 of the MFP 10B. FIG. 8A shows the page corresponding to the "Basic 1" tab in the home screen 40 and has the same functions as the page corresponding to the "Basic 1" tab shown in FIG. 2A. The number and types of icons shown in FIG. 8A may be different from those shown in FIG. 2A. In this example, the home screen 40 displayed by the MFP 10B does not include any record-based shortcut images.

Figure 7:
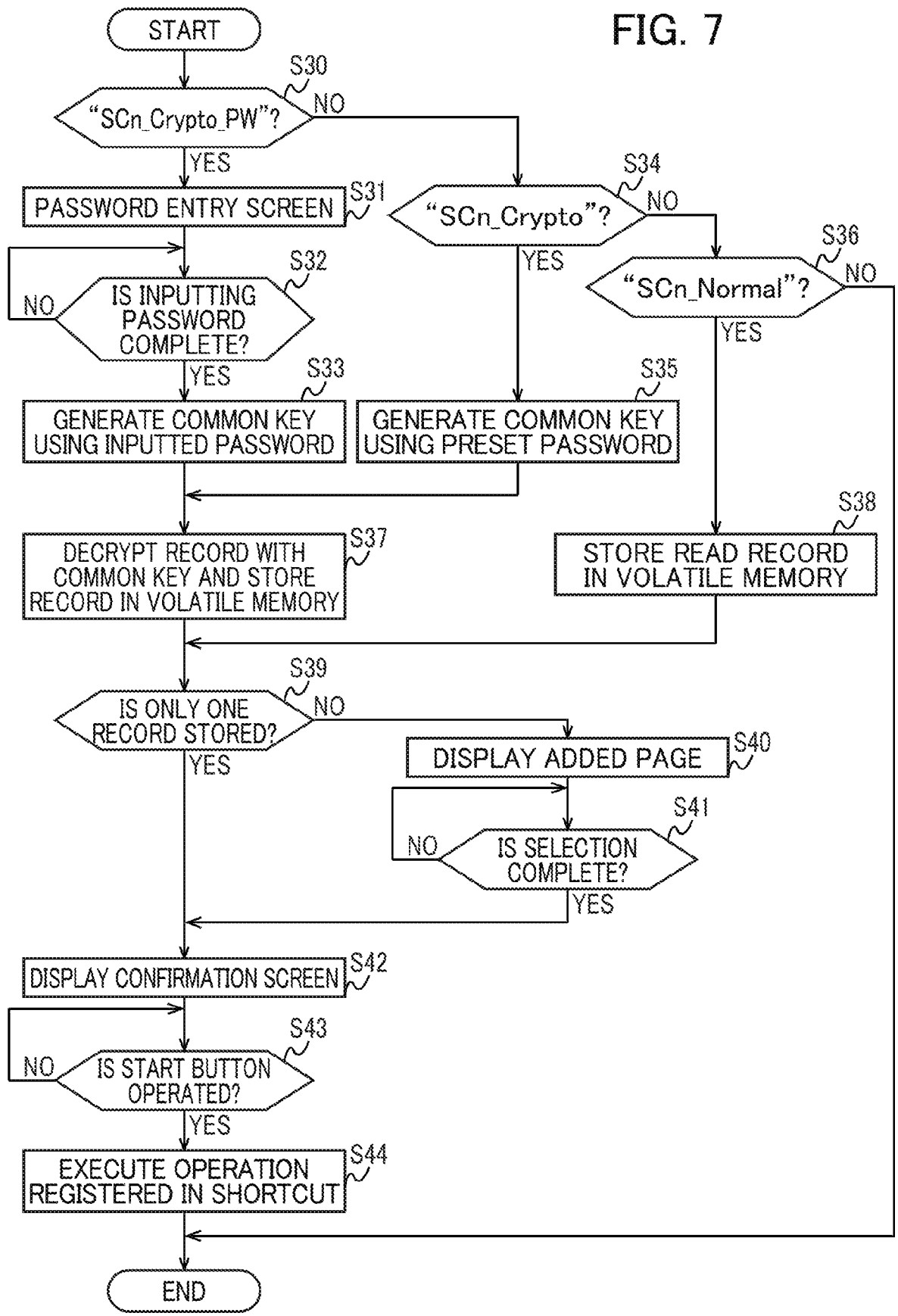
FIG. 7 is a flowchart illustrating a process to execute a function in the record stored in the portable memory.
Figure 8A:
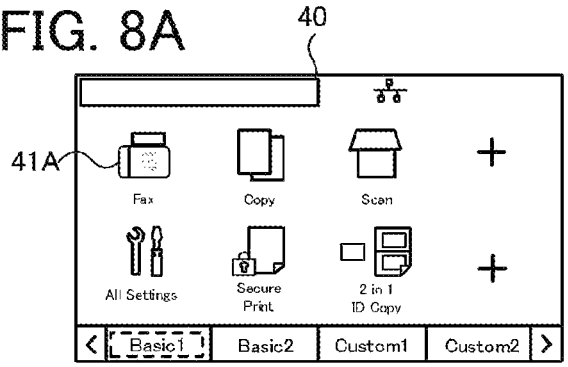
FIGS. 8A-8E are explanatory diagrams illustrating transition of a screen when a function in the record stored in the portable memory is executed.

In S30 of FIG. 7, the controller 11 determines whether the USB memory 19 mounted in the USB interface 17 of the MFP 10B holds a file having the filename "SCn_Crypto_PW". In other words, in S30 the controller 11 determines whether the mounted USB memory 19 holds a file whose filename indicates that the file includes a record for a function and the file is encrypted using a user inputted password. Alternatively, in S30 the controller 11 may determine whether the mounted USB memory 19 holds a file having the filename whose end part has a prescribed character string "_Crypto_PW". When a file having the filename "SCn_Crypto_PW" is not stored in the USB memory 19 (S30: NO), in S34 the controller 11 determines whether the USB memory 19 stores a file with the filename "SCn_Crypto". In other words, in S34 the controller 11 determines whether the mounted USB memory 19 holds a file whose filename indicates that the file includes a record for a function and the file is encrypted using the preset password. Alternatively, in S34 the controller 11 may determine whether the mounted USB memory 19 holds a file having the filename whose end part has a prescribed character string "_Crypto". When the USB memory 19 does not store a file having the filename "SCn_Crypto" (S34: NO), the controller 11 advances to S36.

In S36 the controller 11 determines whether the USB memory 19 stores a file with the filename "SCn_Normal". In other words, in S34 the controller 11 determines whether the mounted USB memory 19 holds a file whose filename indicates that the file includes a record for a function and the file is not encrypted. Alternatively, in S36 the controller 11 may determine whether the mounted USB memory 19 holds a file having the filename whose end part has a prescribed character string "_Normal". When the USB memory 19 does not store a file with the filename "SCn_Normal" (S36: NO), the process in FIG. 7 ends. Thus, when the USB memory 19 newly mounted in the MFP 10B does not hold a file having a record of the function for which a shortcut was registered, the controller 11 reaches a negative determination in S36. In this case, the controller 11 executes a process performed in response to a USB memory 19 being mounted in the USB interface 17. For example, the controller 11 displays a selection screen on the user interface 16 prompting the user to select whether to execute a "Scan to USB" function that uses the mounted USB memory 19 as the destination for scan data or to execute a "USB direct print" function for printing an image based on image data stored in the mounted USB memory 19 and, when the user makes a selection, executes the selected function.

Figure 8B:
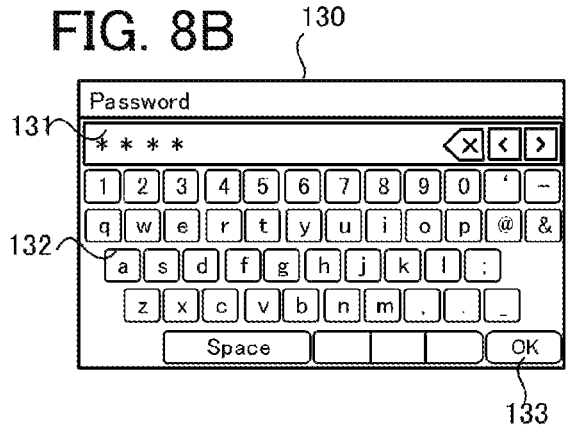

When the controller 11 detects a file with the filename "SCn_Crypto_PW" stored in the USB memory 19 (S30: YES), in S31 the controller 11 displays a password entry screen 130 shown in FIG. 8B on the user interface 16. The password entry screen 130 includes operating keys 132, and a display field 131 for displaying the password inputted through operations on the operating keys 132. The password inputted through operations on the operating keys 132 is displayed in FIG. 8B in the same manner as the password inputted in S19 of FIG. 5. In S32 the controller 11 waits for the user to complete password input and operate an OK button 133 (S32: NO). When the controller 11 detects that the OK button 133 was operated (S32: YES), the controller 11 advances to S33.

In S33 the controller 11 generates a common key using the inputted password. In S37 the controller 11 decrypts the record having the filename "SCn_Crypto_PW" stored in the USB memory 19 using the common key generated in S33 and stores the decrypted record in the volatile memory of the memory 12. When decryption of the record fails in S37, the controller 11 displays an error message on the user interface 16 and ends the process of FIG. 7. Alternatively, the controller 11 may return to S31 in the event of a decryption failure and redisplay the password entry screen on the user interface 16 to accept re-entry of a password.

Further, when the controller 11 determines in S34 that a file with the filename "SCn_Crypto" is stored in the USB memory 19 (S34: YES), the controller 11 advances to S35. When the filename includes "Crypto", the file was encrypted using a preset password. Accordingly, in S35 the controller 11 generates a common key using the preset password. Subsequently, in S37 the controller 11 uses the common key generated in S35 to decrypt the record stored in the USB memory 19 having filename "SCn_Crypto" and stores the decrypted record in the volatile memory of the memory 12. In the present embodiment, the controller 11 of the MFP 10A encrypts files according to a method that cannot be decrypted without using a common key created with the same password used to encrypt the record.

Further, when the controller 11 determines in S36 that a file with the filename "SCn_Normal" is stored in the USB memory 19 (S36: YES), the controller 11 advances to S38. When the filename includes "Normal," the file has not been encrypted. Thus, in S38 the controller 11 reads the record in the file having filename "SCn_Normal" from the USB memory 19 and stores the record in the volatile memory of the memory 12.

When records corresponding to a plurality of functions have been encrypted and copied to the USB memory 19, as described above, all records for the plurality of functions can be decrypted using the common key generated in S33 or S35, provided that the password used for encryption is common. In such cases, the controller 11 may decrypt all the records that can be decrypted by the common password (the inputted password in S32 or the preset password) and store the decrypted records in the volatile memory of the memory 12.

Records for a plurality of functions may be copied in the USB memory 19 without being encrypted. In such cases, the controller 11 may store all the records in the volatile memory of the memory 12. Thus, in S39 the controller 11 determines whether only one record corresponding to one function has been stored in the volatile memory. When only one record for one function is stored in the volatile memory (S39: YES), in S42 the controller 11 displays the confirmation screen 70 shown in FIG. 8C on the user interface 16 using the record corresponding to the single function stored in the volatile memory. As with the confirmation screen 70 shown in FIG. 4B, the confirmation screen 70 in FIG. 8C corresponds to the "Scan to e-mail server" function and can accept operations to modify initial values 24 in the temporarily stored record through operations on the buttons 71A-71E. In other words, when initial values 24 are modified through operations in the confirmation screen 70, the initial values in the record temporarily stored in the volatile memory are not those in the record that has been copied to the USB memory 19.

In S43 the controller 11 waits while the Start button 72 in the confirmation screen 70 has not been operated (S43: NO). When the controller 11 detects an operation on the Start button 72 (S43: YES), in S44 the controller 11 executes the "Scan to e-mail server" function using the temporarily stored record. At this time, the controller 11 displays the execution screen 80 shown in FIG. 8D, which is similar to the execution screen 80 shown in FIG. 4D.

Figure 8C:
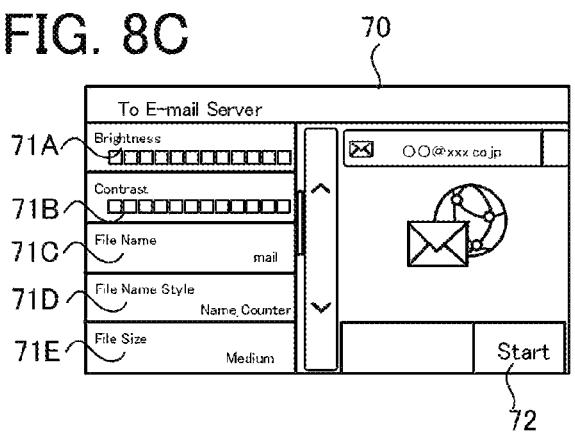
Figure 8D:
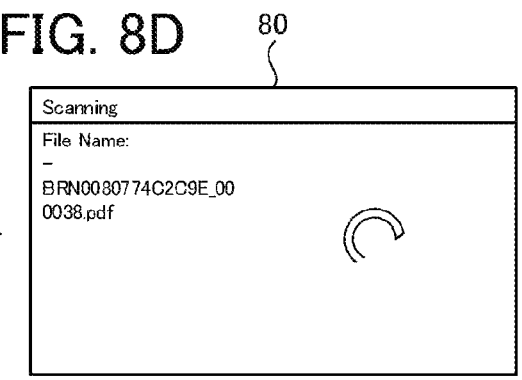
Figure 8E:
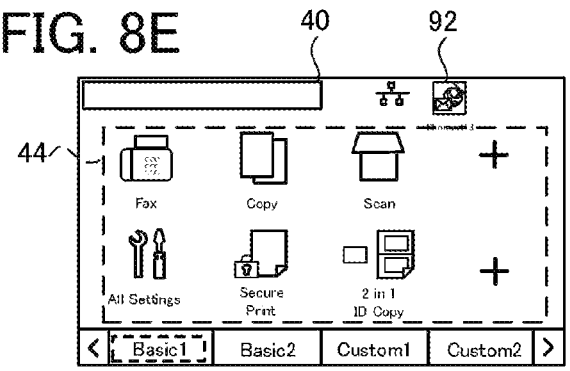

After execution of the "Scan to e-mail server" function is complete, the controller 11 redisplays the home screen 40 shown in FIG. 8E. In this embodiment, the home screen 40 displayed after executing the function using the record copied to the USB memory 19 includes a shortcut image 92 that is associated with the executed function. Specifically, the shortcut image 92 corresponding to "Scan to e-mail server" is displayed in the home screen 40 outside the icon display area 44.

When the controller 11 detects that the shortcut image 92 was operated in the home screen 40 shown in FIG. 8E, the controller 11 reads the record temporarily stored in the volatile memory and redisplays the confirmation screen 70 shown in FIG. 8C on the user interface 16, as in S42 described above. When the controller 11 detects that the Start button 72 was operated in the confirmation screen 70, the controller 11 executes the "Scan to e-mail server" function according to the record read from the volatile memory. Hence, the MFP 10B can repeatedly execute the "Scan to e-mail server" function that was registered on the MFP 10A as a shortcut and whose record was subsequently transferred to the MFP 10B via the USB memory 19.

On the other hand, when the USB memory 19 is removed from the MFP 10B while the home screen 40 shown in FIG. 8E is displayed on the user interface 16, the controller 11 hides (or removes) the shortcut image 92 that was displayed on the home screen 40. Thus, after the USB memory 19 is removed from the MFP 10B, the user of the MFP 10B is no longer able to execute the "Scan to e-mail server" function that was registered on the MFP 10A as a shortcut. Alternatively, even when the USB memory 19 is not mounted on the USB interface 17, the shortcut image 92 may be maintained. In this case, the record of the shortcut image 92 may be stored in the nonvolatile memory of the memory 12. In this case, when the user presses and holds the shortcut image 92, a screen similar to that shown in FIG. 2B may be displayed and information of the record may be edited through screens similar to those shown in FIGS. 2B-2F. Or, when the user presses and holds the shortcut image 92, a screen similar to that shown in FIG. 2C may be displayed and information of the record may be edited through screens similar to those shown in FIGS. 2C-2F. Or, when the user presses and holds the shortcut image 92, a screen similar to that shown in FIG. 2D may be displayed and information of the record may be edited through screens similar to shoes shown in FIGS. 2D-2F. While editing of the information of the record is performed, at least one of the screens similar to shoes shown in FIGS. 2A-2F may be omitted. For example, the screen similar to that shown in FIG. 2E may be omitted.

Figure 9A:
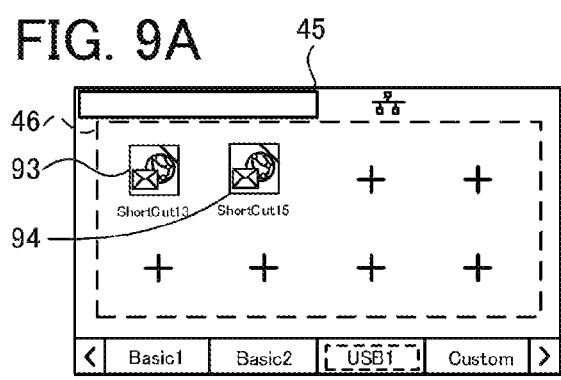
FIGS. 9A-9D are explanatory diagrams illustrating transition of a screen when a function in the record stored in the portable memory is executed.

Returning to FIG. 7, when the controller 11 detects in S39 that records for a plurality of functions are copied to the volatile memory from the USB memory 9 (S39: NO), in S40 the controller 11 adds a page for the records copied to the USB memory 19 (and now also copied to the volatile memory) to the home screen. FIG. 9A shows a home screen 45 in which a page was added in S40. The page is associated with a new tab having the name "USB 1". In this example, the home screen 45 displays a shortcut image 93 that has the shortcut display name "Shortcut 13" and corresponds to the "Scan to e-mail server" function, and a shortcut image 94 that has the shortcut display name "Shortcut 15" and corresponds to a function different from the function of the shortcut image 93. The home screen 45 has a similar configuration to the "Basic 1" page shown in FIG. 8A. That is, the home screen 45 has an icon display area 46 with m rows and n columns, and the shortcut images 93 and 94 associated with the functions whose records have been copied to the USB memory 19 are arranged in this icon display area 46.

Figure 9B:
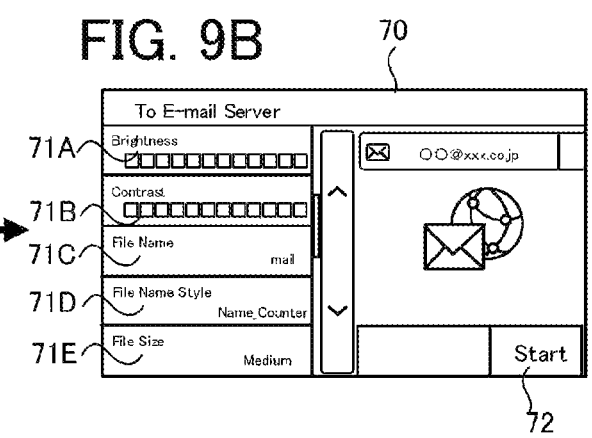
Figure 9C:
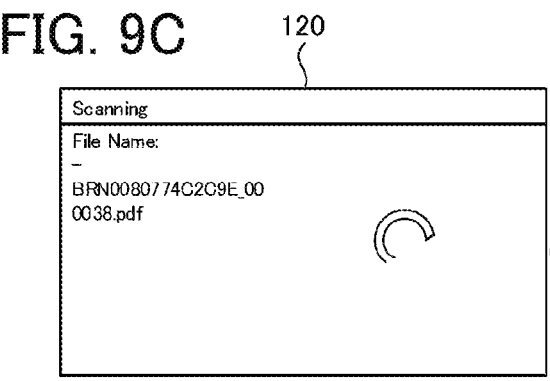

In S41 the controller 11 determines whether a selection operation was received in the home screen 45 for a function to be executed and continues to wait while a selection has not been made (S41: NO). When the controller 11 receives a selection operation in the home screen 45 (S41: YES), in S42 the controller 11 displays the confirmation screen 70 shown in FIG. 9B on the user interface 16. This confirmation screen 70 is similar to the confirmation screen 70 shown in FIG. 8C. Once the controller 11 detects an operation on the Start button 72 in the confirmation screen 70 (S43: YES), in S44 the controller 11 executes the function selected in S45 using the corresponding record stored in the volatile memory of the memory 12. In this example, the shortcut image 93 associated with the "Scan to e-mail server" function was operated in the home screen 45, and the controller 11 displays an execution screen 120 shown in FIG. 9C, which is similar to the screen shown in FIG. 8D.

Figure 9D:
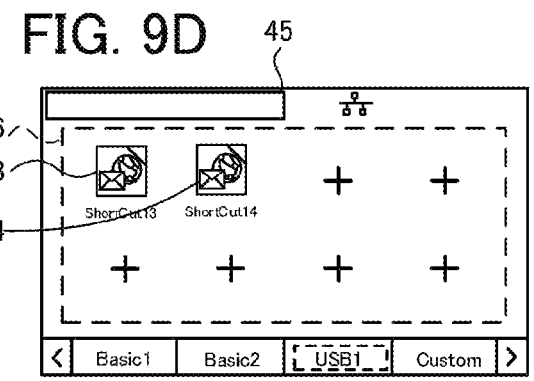

After completing execution of the "Scan to e-mail server" function, the controller 11 redisplays the home screen 45 shown in FIG. 9D. The home screen 45 in FIG. 9D is the same page as the home screen 45 shown in FIG. 9A. In other words, when one of the shortcut images 93 and 94 is operated in the home screen 45, the controller 11 reads the record corresponding to the operated shortcut image from the volatile memory and displays a confirmation screen 70 similar to that shown in FIG. 9B on the user interface 16. Once the controller 11 detects an operation on the Start button 72 in the confirmation screen 70, the controller 11 can execute the function corresponding to the operated shortcut image. When the USB memory 19 is removed from the MFP 10B while the home screen 45 shown in FIG. 9D is displayed, the controller 11 hides (or removes) the shortcut images 93 and 94 from the home screen 40 in this case as well. In the embodiment, the controller 11 displaying the home screen 40 shown in FIG. 8E or 9D, and the controller 11 displaying the home screen shown in FIG. 9A are examples of the process displaying the shortcut icon.

Variations of the First Embodiment

In the embodiment described above, when the USB memory 19 having the record copied from the MFP 10A is mounted in the MFP 10B, the controller 11 of the MFP 10B executes the function of the type indicated by the record using the settings values specified in the record, as described in FIG. 7. Alternatively, when the USB memory 19 having the record copied from the MFP 10A is remounted in the MFP 10A, the controller 11 of the MFP 10A may execute the function using settings values specified in the record copied to the USB memory 19. For example, after the MFP 10A copies a record for a prescribed function from the shortcut information 20 registered in the memory 12 to the USB memory 19, the MFP 10A may delete the corresponding record from the memory 12. In such a case, when the USB memory 19 is remounted in the USB interface 17 of the MFP 10A, the controller 11 of the MFP 10A can execute the series of processes shown in FIG. 7 to implement the type of function specified in the record copied to the USB memory 19 using the settings values specified in the record. In this example, when the USB memory 19 is removed from the MFP 10A while the shortcut image associated with the copied record is displayed on the home screen 40 of the MFP 10A, the controller 11 of the MFP 10A hides (or removes) the shortcut images (such as the images 93 and 94) that were displayed on the home screen 40. In S37 the controller 11 of the MFP 10A may encrypt the file according to a method that allows decryption using a password different from the password used to encrypt the record (obviously not just any password, but a password sufficiently defined to ensure security).

Second Embodiment

Next, a second embodiment will be described while focusing on configurations that differ from those in the first embodiment. In the second embodiment, like parts and components are designated with the same reference numerals to avoid duplicating description. The second embodiment differs from the first embodiment in the manner that shortcut images are displayed when the USB memory 19 having records for a plurality of functions recorded thereon is mounted in the MFP 10B.

Figure 10A:
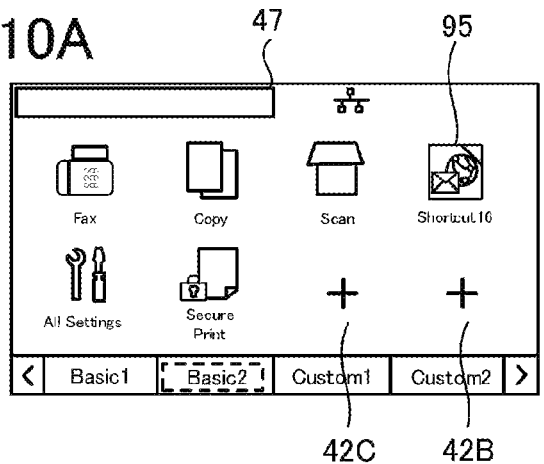
FIGS. 10A-10C are explanatory diagrams illustrating transition of a screen when a function in the record stored in the portable memory is executed.

FIG. 10A shows a home screen 47 according to the second embodiment. In FIG. 10A, a page corresponding to the "Basic 2" tab is displayed in the home screen 47. Although the number and types of icons differ, the page corresponding to the "Basic 2" tab has similar functions to the page corresponding to the "Basic 1" tab. The home screen 47 includes a shortcut image 95 whose shortcut display name 21 is "Shortcut 16."

After executing the function in S44 of FIG. 7 described in the first embodiment, the controller 11 determines whether the number of records copied to the USB memory 19 is less than or equal to a prescribed number. For example, the controller 11 determines whether the number of records copied to the USB memory 19 is less than or equal to the number of unregistered keys 42 that were displayed on the home screen 47 when the USB memory 19 was mounted in the MFP 10B. When the number of records copied to the USB memory 19 is less than or equal to the prescribed number, the controller 11 displays the home screen 47 in a first mode shown in FIG. 10B. Specifically, the controller 11 displays the shortcut image 93 associated with the "Scan to e-mail server" function that corresponds to the record copied to the USB memory 19 at the position in the displayed page where the unregistered key 42 was displayed.

For example, when two records are copied to the USB memory 19, the controller 11 displays the shortcut images corresponding to these two records at the positions of unregistered keys 42B and 42C. In other words, in the home screen 47 shown in FIG. 10B a shortcut icon specified by each record is arranged in the icon area at the same position as the vacant icon area of the home screen displayed in the home screen 47 shown in FIG. 10A. Here, the vacant icon area is the icon area in which no icon associated with an image formation process is arranged in the home screen 47 shown in FIG. 10A.

On the other hand, when the number of records copied to the USB memory 19 exceeds the prescribed number, the controller 11 displays the shortcut images in a second mode. That is, in the second mode, as shown in FIG. 10C the controller 11 displays one or more shortcut images in a different page from that displayed when the USB memory 19 was mounted in the MFP 10B. For example, when the number of unregistered keys 42 (=the prescribed number) is two and four records were copied to the USB memory 19, the controller 11 arranges two of the shortcut images at the positions of the two unregistered keys 42 on the page corresponding to the "Basic 2" tab that was displayed when the USB memory 19 was mounted (i.e., the home screen 47 shown in FIG. 10A) and arranges the remaining two shortcut images 96 and 97 at the positions of unregistered keys 42 on an additional page (i.e., a home screen 48) corresponding to the "USB 1" tab shown in FIG. 10C, which is similar to the screen displayed in FIG. 9A. As with the home screen 47 shown in FIG. 10A, the home screen 48 in FIG. 10C can display eight shortcut images in an icon display area 49. Note that all four shortcut images corresponding to records copied to the USB memory 19 may be arranged on the additional page corresponding to the "USB 1" tab without arranging any on the "Basic 2" page.

Alternatively, when the number of records copied to the USB memory 19 exceeds the prescribed number, the controller 11 displays the home screen 47 of the "Basic 2" page so that all of the shortcut images can be arranged in this home screen 47 at positions of the two unregistered keys 42 or the positions where the icons are arranged in the home screen 47 when the USB memory 19 was mounted in the MFP 10B as shown in FIG. 10A. In other words, all or some of icons shown in FIG. 10A are replaced with the record-based shortcut images. Provided that all the record-based shortcut images can be displayed in the home screen 47, some of icons shown in FIG. 10A may be remained in the home screen 47. Further, in a case that the home screen 47 when the USB memory 19 was mounted in the MFP 10B includes one or more shortcut images, these one or more shortcut images may be replaced with the shortcut images based on the records copied in the USB memory 19.

Variations of the Second Embodiment

Figure 10B:
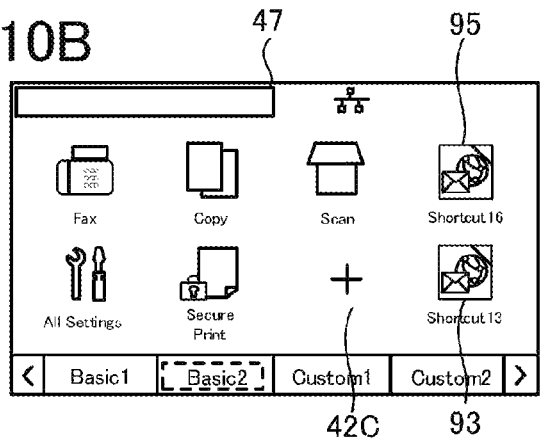
Figure 10C:
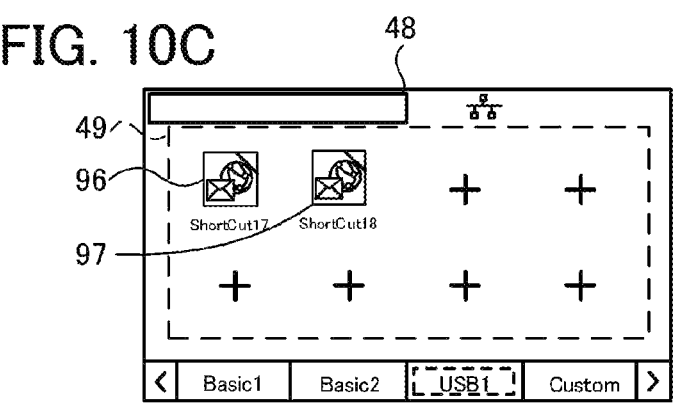

The controller 11 of the MFP 10B may switch the display of shortcut images between the first mode shown in FIG. 10B and the second mode shown in FIG. 10C on the basis of information specifying the display mode. In this case, the shortcut information 20 may include a settings item specifying the display mode. When the controller 11 determines that the value of the settings item for a record that was read from the USB memory 19 and stored in the volatile memory specifies the first mode, the controller 11 displays shortcut images in the existing page of the home screen according to the first mode shown in FIG. 10B. However, when the controller 11 determines that the value of the settings item stored in the volatile memory indicates the second mode, the controller 11 displays shortcut images on an additional page according to the second mode shown in FIG. 10C. As an alternative, the controller 11 may be configured to store information specifying the display mode in the memory 12 in response to instructions received via the user interface 16 or may be configured to receive information specifying the display mode from a PC connected to the network and to store the received information in the memory 12.

In response to instructions received via the user interface 16, the controller 11 of the MFP 10A can copy records included in the shortcut information 20 to the USB memory 19 mounted in the USB interface 17. When the controller 11 of the MFP 10B, constituting the second device, detects that one or more records have been copied to the USB memory 19 mounted in the MFP 10B, the controller 11 executes a function of the type indicated by the detected record using the settings values specified in the detected record. This enables the user to execute the function using the record copied from the MFP 10A to the USB memory 19 by mounting the USB memory 19 into the USB interface 17 of the MFP 10B, thereby providing a highly convenient system for user operations.

When the controller 11 of the MFP 10B detects only one copied record in the newly mounted USB memory 19, the controller 11 executes a function of the type specified in the detected record using the settings values indicated in the detected record. When the controller 11 of the MFP 10B detects a plurality of copied records in the USB memory 19, the controller 11 accepts a selection instruction for one of the records in accordance with an operation on the user interface 16 and executes a function of the type indicated by the selected record using the settings values specified in the record. This enables the user to select a record in the shortcut information for use on another device, even when information for a plurality of shortcuts has been copied to the USB memory 19.

When a shortcut image on the home screen 40 is operated after a function was executed using a record stored on the USB memory 19, the controller 11 of the MFP 10B executes the function corresponding to the record associated with the operated shortcut image using settings values specified in the record associated with the shortcut image. In this way, a function that can be executed through a record copied to the USB memory 19 can be continuously executed on another device.

When the user executes a function corresponding to a record copied to the USB memory 19, the controller 11 redisplays the home screen to include a shortcut image associated with the record. Thereafter, when the USB memory 19 is removed from the USB interface 17 of the MFP 10B while the home screen is displaying the shortcut image associated with this record, the controller 11 of the MFP 10B hides (or removes) the added shortcut image from the display of the home screen. Removing the shortcut image from the display after the USB memory 19 is removed from the MFP 10B can prevent user operation error.

When the user executes a function according to a record copied to the USB memory 19, the controller 11 of the MFP 10B adds a shortcut image for the function to a single icon display area in the home screen. This allows the shortcut image for a record copied to the USB memory 19 to be displayed in the same location or region as shortcut images already registered on the MFP 10B, thereby enhancing user operability.

After the controller 11 of the MFP 10B executes a function corresponding to a record copied to the USB memory 19, the controller 11 displays a shortcut image for the function in an area different from the icon display area 44 of the home screen. This enables the user to distinguish between shortcut images associated with functions whose records were copied and shortcut images already registered on the MFP 10B.

The controller 11 of the MFP 10B temporarily stores settings values indicated by records copied to the USB memory 19 in the volatile memory and displays an operation screen for accepting modifications to settings values corresponding to the detected record. When the controller 11 is instructed to modify a settings value in response to an operation in the operation screen, the controller 11 changes the settings value stored in the volatile memory without changing the record copied to the USB memory 19 and executes a function of the type specified in the record using the modified settings values stored in the volatile memory. This method can prevent shortcut information copied to the USB memory 19 from being changed when used on other devices.

The embodiments described above can obtain the following effects. In response to instructions received via the user interface 16, the controller 11 of the MFP 10A can copy records included in the shortcut information 20 to the USB memory 19 mounted in the USB interface 17. When the controller 11 of a second device (the MFP 10B) detects that the USB memory 19 mounted in the USB interface 17 has records copied thereto, the controller 11 displays shortcut images corresponding to the types of functions specified by the detected records on the user interface 16. This enables the user to use records already registered on the MFP 10A with the MFP 10B simply by mounting the USB memory 19 in the USB interface 17 of the MFP 10B. Hence, this configuration provides a highly convenient system for the user.

When the user operates a shortcut image displayed in the home screen, the controller 11 of the MFP 10B executes the corresponding function and thereafter redisplays the home screen on the user interface 16. In the second embodiment, when the number of records copied to the USB memory 19 is less than or equal to the prescribed number, the controller 11 displays the shortcut images in the home screen according to the first mode. However, when the number of records copied to the USB memory 19 is greater than the prescribed number, the controller 11 displays the shortcut images in the home screen according to the second mode. Thus, the controller 11 can vary the display mode according to the number of records that were copied to the USB memory 19, improving convenience for user operations.

When the number of records copied to the USB memory 19 is less than or equal to the prescribed number, in the second embodiment the controller 11 displays the shortcut images in the icon display area according to the first mode. However, when the number of records copied to the USB memory 19 is greater than the prescribed number, the controller 11 displays the shortcut images in a different page from the page that includes the icon display area, according to the second mode. In this way, the controller 11 can vary the mode for displaying shortcut icons according to the number of icons that can be displayed in the home screen.

When information specifying the first mode is registered in the memory 12, the controller 11 of the MFP 10B displays the shortcut images in the home screen according to the first mode. However, when information specifying the second mode is registered in the memory 12, the controller 11 displays the shortcut images in the home screen according to the second mode. In this way, the controller 11 can vary the mode for displaying shortcut images according to information registered in records.

When the USB memory 19 is mounted in the USB interface 17, the controller 11 of the MFP 10B detects whether records have been copied to the mounted USB memory 19. When records are detected, the controller 11 displays shortcut images associated with those detected records in the icon display area of the home screen. In this way, the controller 11 can arrange shortcut icons for copied records at the same location or region as existing icons, thereby enhancing convenience for user operations.

When the controller 11 of the MFP 10B detects that records have been copied to the USB memory 19 mounted in the USB interface 17, the controller 11 displays a separate screen from the home screen and displays shortcut images associated with the detected records in the separate screen. In this way, the controller 11 can display shortcut images associated with records that were copied to the USB memory 19 in a screen separate from the home screen, thereby enhancing convenience for user operations.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the shortcut images displayed in the home screen are the shortcut icons associated with records that were copied to the USB memory 19. However, when a USB memory 19 is mounted in the MFP, shortcut icons associated with the copied records may be displayed using different icons from the shortcut images already displayed in the home screen.

The system 1 in the embodiment described above is configured of two MFPs 10A and 10B, but the system 1 may be configured of three or more MFPs as well. Further, MFPs are merely one example of the image forming device in the present invention. The image forming device may be a device that possesses only a single function, such as a print function or a scan function.

What is claimed is:
1. A system comprising:
a first image forming device; and
a second image forming device,
wherein the first image forming device includes:
   a first user interface;
   a first memory interface to which a portable memory can be detachably mounted;
   a first image formation engine configured to form an image; and
   a first controller,
wherein the second image forming device includes:
   a second user interface;
   a second memory interface to which the portable memory can be detachably mounted;
   a second image formation engine configured to form an image; and
   a second controller,
wherein the first controller is configured to perform:
   an image formation process to form an image using the first image formation engine;
   displaying a shortcut icon on the basis of a piece of shortcut information on the first user interface, the piece of shortcut information specifying an image formation process and a settings value for the image formation process, the piece of shortcut information further specifying that the image formation process and the settings value are associated with the shortcut icon;
   in response to receiving an operation on the shortcut icon, controlling the first image formation engine to perform the image formation process specified in the piece of shortcut information using the settings value specified in the piece of shortcut information; and
   in response to receiving an instruction via the first user interface, copying the piece of shortcut information to the portable memory mounted to the first memory interface so that the portable memory stores a copied piece of shortcut information,
wherein the second controller is configured to perform:
   an image formation process to form an image using the second image formation engine; and
   after the portable memory is mounted to the second memory interface, a shortcut process related to the copied piece of shortcut information,
wherein the second controller is configured to further perform:
   controlling the second user interface to display a first home screen including an m×n matrix area including icon areas arranged in an m×n matrix to define m rows and n columns, m and n being natural numbers, an icon being capable of being arranged in each of the icon areas, an icon associated with an image formation process being arranged in at least one of the icon areas in the first home screen;
   in response to receiving an operation on the icon in the first home screen, the image formation process associated with the icon and thereafter redisplaying the first home screen;

after the shortcut process is complete, a displaying process to display on the second user interface a second home screen in which a shortcut icon specified by the copied piece of shortcut information is arranged; and in response to receiving an operation on the shortcut icon displayed on the second home screen, the image formation process specified by the copied piece of shortcut information with the settings value specified by the copied piece of shortcut information.

2. The system according to claim 1, wherein the shortcut process includes:

an image formation process using a settings value, the image formation process in the shortcut process being the image formation process specified by the copied piece of shortcut information, the settings value used in the shortcut process being the settings value specified by the copied piece of shortcut information.

3. The system according to claim 2, wherein the second image forming device further includes a memory, wherein the shortcut process includes:

copying the settings value specified by the copied piece of shortcut information to the memory from the portable memory mounted to the second memory interface so that the memory stores a copied settings value;

displaying an operation screen to receive an instruction to modify the copied settings value on the second user interface; and in response to receiving the instruction to modify the copied settings value through the operation screen, modifying the copied settings value in the memory, wherein in the shortcut process, the image formation process specified by the copied piece of shortcut information is performed with the modified copied settings value in the memory.

4. The system according to claim 1, wherein the second controller is configured to further perform:

after the portable memory is mounted to the second memory interface, determining whether the portable memory mounted to the second memory interface stores the copied piece of shortcut information, wherein when the determining determines that the portable memory mounted to the second memory interface stores the copied piece of shortcut information, the shortcut process is performed, wherein the shortcut icon specified by the copied piece of shortcut information is arranged in one of the icon areas in the second home screen.

5. The system according to claim 4, wherein in a case that the number of vacant icon areas in the first home screen is greater than or equal to one, the displaying process displays the second home screen by modifying the first home screen, in the second home screen the shortcut icon specified by the copied piece of shortcut information being arranged in one of the icon areas of the same rows and columns as the vacant icon areas while arrangement of each icon arranged in the first home screen is maintained, the vacant icon areas being icon areas in which no icon associated with an image formation process has been arranged among the icon areas in the first home screen.

6. The system according to claim 4, wherein the displaying process displays the second home screen by modifying the first home screen, in the second home screen the shortcut icon being arranged in the one of the icon areas of the same row and column as one of the at least one of the icon areas in the first home screen in place of the icon which has been arranged in the one of the at least one of the icon areas in the first home screen.

7. An image forming device comprising:

a user interface;

a memory interface to which a portable memory can be detachably mounted;

an image formation engine configured to form an image; and a controller, wherein the controller is configured to perform:

an image formation process to form an image using the image formation engine;

displaying a shortcut icon on the basis of a piece of shortcut information on the user interface, the piece of shortcut information specifying an image formation process and a settings value for the image formation process, the piece of shortcut information further specifying that the image formation process and the settings value are associated with the shortcut icon;

in response to receiving an operation on the shortcut icon, controlling the image formation engine to perform the image formation process specified in the piece of shortcut information using the settings value specified in the piece of shortcut information; and after the portable memory storing a copied piece of shortcut information is mounted to the memory interface, a shortcut process related to the copied piece of shortcut information, the copied piece of shortcut information being a copy of the piece of shortcut information, wherein the controller is configured to further perform:

controlling the user interface to display a first home screen including an m×n matrix area including icon areas arranged in an m×n matrix to define m rows and n columns, m and n being natural numbers, an icon being capable of being arranged in each of the icon areas, an icon associated with an image formation process being arranged in at least one of the icon areas in the first home screen;

in response to receiving an operation on the icon in the first home screen, the image formation process associated with the icon and thereafter redisplaying the first home screen;

after the shortcut process is complete, a displaying process to display on the user interface a second home screen in which a shortcut icon specified by the copied piece of shortcut information is arranged; and in response to receiving an operation on the shortcut icon displayed on the second home screen, the image formation process specified by the copied piece of shortcut information with the settings value specified by the copied piece of shortcut information.

8. The image forming device according to claim 7, wherein the shortcut process includes:

an image formation process using a settings value, the image formation process in the shortcut process being the image formation process specified by the copied piece of shortcut information, the settings value used in the shortcut process being the settings value specified by the copied piece of shortcut information.

9. The image forming device according to claim 8, further comprising a memory,
wherein the shortcut process includes:
copying the settings value specified by the copied piece of shortcut information from the mounted portable memory to the memory so that the memory stores a copied settings value;
displaying an operation screen to receive an instruction to modify the copied settings value on the user interface; and
in response to receiving the instruction to modify the copied settings value through the operation screen, modifying the copied settings value in the memory,
wherein in the shortcut process, the image formation process specified by the copied piece of shortcut information is performed with the modified copied settings value in the memory.

10. The image forming device according to claim 7,
wherein the controller is configured to further perform:
after the portable memory is mounted to the memory interface, determining whether the mounted portable memory stores the copied piece of shortcut information,
wherein when the determining determines that the mounted portable memory stores the copied piece of shortcut information, the shortcut process is performed,
wherein the shortcut icon specified by the copied piece of shortcut information is arranged in one of the icon areas in the second home screen.

11. The image forming device according to claim 10, wherein in a case that the number of vacant icon areas in the first home screen is greater than or equal to one, the displaying process displays the second home screen by modifying the first home screen, in the second home screen the shortcut icon specified by the copied piece of shortcut information being arranged in one of the icon areas of the same rows and columns as the vacant icon areas while arrangement of each of the icons arranged in the first home screen is maintained, the vacant icon areas being icon areas in which no icon associated with an image formation process has been arranged among the icon areas in the first home screen.

12. The image forming device according to claim 10, wherein the displaying process displays the second home screen by modifying the first home screen, in the second home screen the shortcut icon being arranged in one of the icon areas of the same row and column as one of the at least one of the icon areas in the first home screen in place of the icon which has been arranged in the one of the at least one of the icon areas in the first home screen.

13. An image forming device comprising:
a user interface;
a memory interface to which a portable memory can be detachably mounted;
an image formation engine configured to form an image; and
a controller,
wherein the controller is configured to perform:
an image formation process to form an image using the image formation engine;
displaying a shortcut icon on the basis of a piece of shortcut information on the user interface, the piece of shortcut information specifying an image formation process and a settings value for the image formation process, the piece of shortcut information further specifying that the image formation process and the settings value are associated with the shortcut icon;
in response to receiving an operation on the shortcut icon, controlling the image formation engine to perform the image formation process specified in the piece of shortcut information using the settings value specified in the piece of shortcut information; and
in response to receiving an instruction via the user interface, copying the piece of shortcut information to the portable memory mounted to the memory interface so that the portable memory stores a copied piece of shortcut information,
wherein in a case that the instruction, which is issued through a special operation performed on the piece of shortcut information, is received via the user interface while the portable memory is mounted to the memory interface, the copying the piece of shortcut information to the portable memory is performed,
wherein the controller is configured to further perform:
editing the piece of shortcut information in a case that the portable memory is not mounted to the memory interface and the special operation is performed on the shortcut icon.

14. The image forming device according to claim 13, wherein the controller is configured to further perform:
when the portable memory is mounted to the memory interface, determining whether the mounted portable memory stores the copied piece of shortcut information; and
when the determining determines that the mounted portable memory stores the copied piece of shortcut information, the image formation process specified by the copied piece of shortcut information with the settings value specified by the copied piece of shortcut information.

* * * * *